July 6, 1937. A. TAKATA 2,086,448

FIBER DRESSING MACHINE

Filed July 28, 1936 5 Sheets-Sheet 1

INVENTOR.
A. Takata
BY:
Glascock Downing Seebree
ATTORNEY.

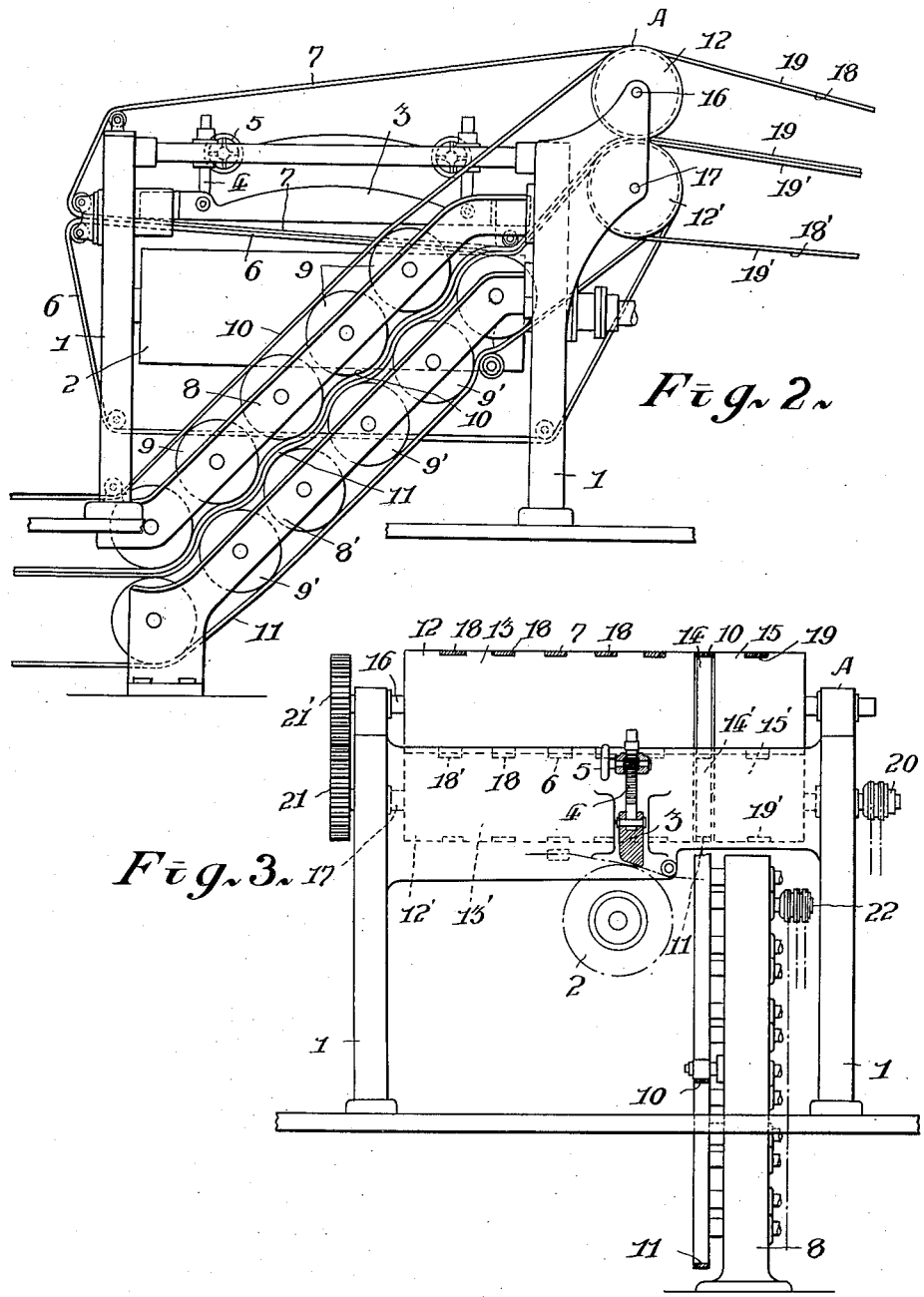

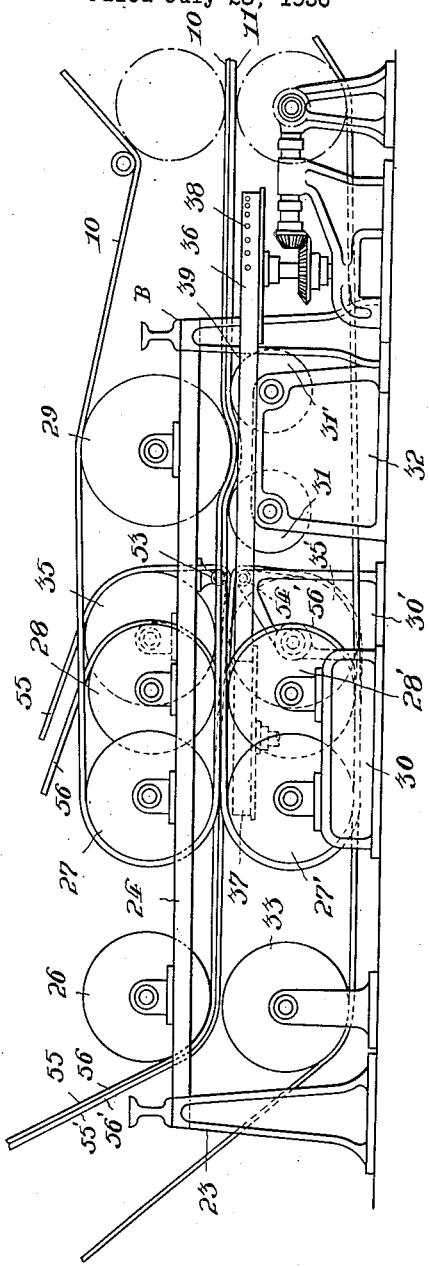

July 6, 1937. A. TAKATA 2,086,448
FIBER DRESSING MACHINE
Filed July 28, 1936 5 Sheets-Sheet 5
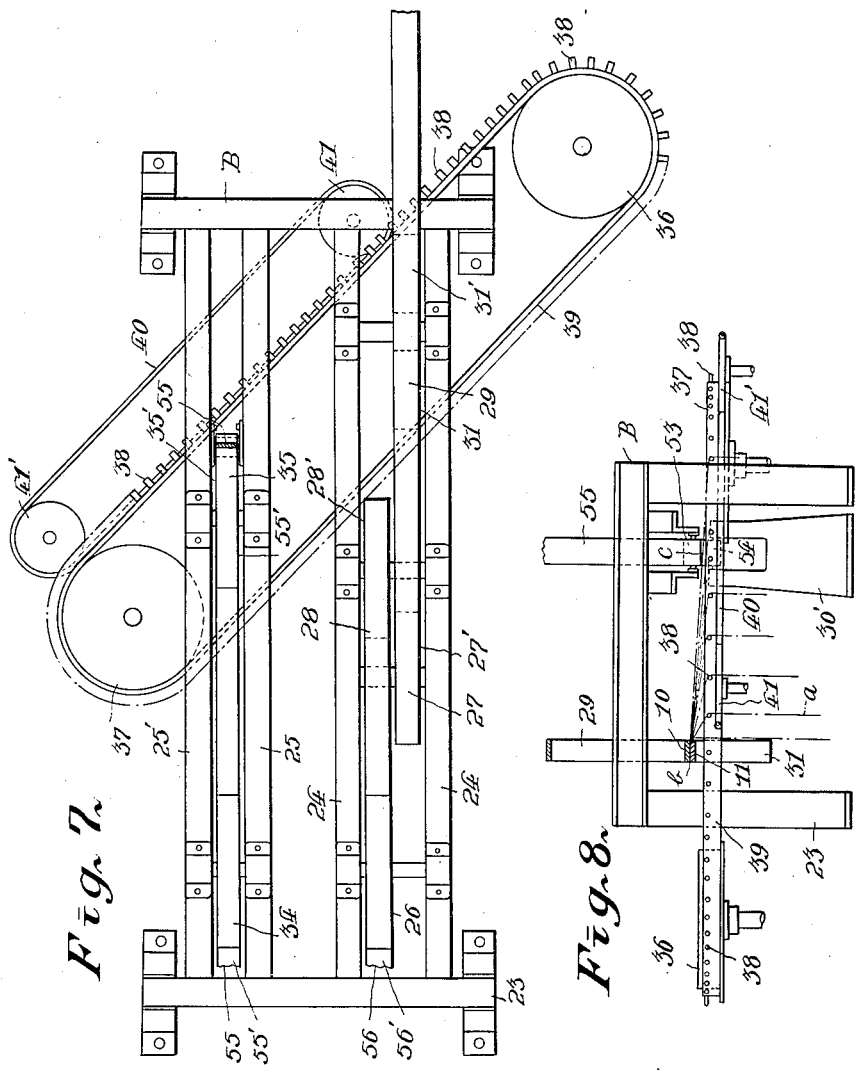
INVENTOR.
A. Takata
BY Glascock Downing + Seebold
ATTORNEY.

Patented July 6, 1937

2,086,448

UNITED STATES PATENT OFFICE 2,086,448

FIBER DRESSING MACHINE

Akira Takata, Toyotsu-Mura, Kyoto-Gun, Fukuoka-Ken, Japan

Application July 28, 1936, Serial No. 93,104

1 Claim. (Cl. 19—12)

This invention relates to fiber dressing machines, and has for its object to provide a machine by which the opening of fiber can be ensured in a drawing relation economically without wasting material in a continuous operation.

The machine according to the invention comprises an apparatus by which material is conveyed, being gripped at one end, while other end is opened, an apparatus for changing the grip to reverse the opened end and the gripped unopened end of material and an apparatus for opening the unopened end after the reversal, whereby ramie or like material can be opened in its entirety from one end to other end to prevent a waste of material.

One embodiment of the invention will be described with reference to the accompanying drawings in which:

Fig. 2 is a front detail view in an enlarged scale of an arrangement shown on the right-hand end in Fig. 1.

Fig. 3 is a side view of the arrangement shown in Fig. 2.

Fig. 6 is a front detail view in an enlarged scale of a material grip changing apparatus shown in the middle in Fig. 1.

Fig. 7 is a plan view of the apparatus shown in Fig. 6.

Fig. 8 is a side view of the apparatus shown in Fig. 6.

Figure 1:
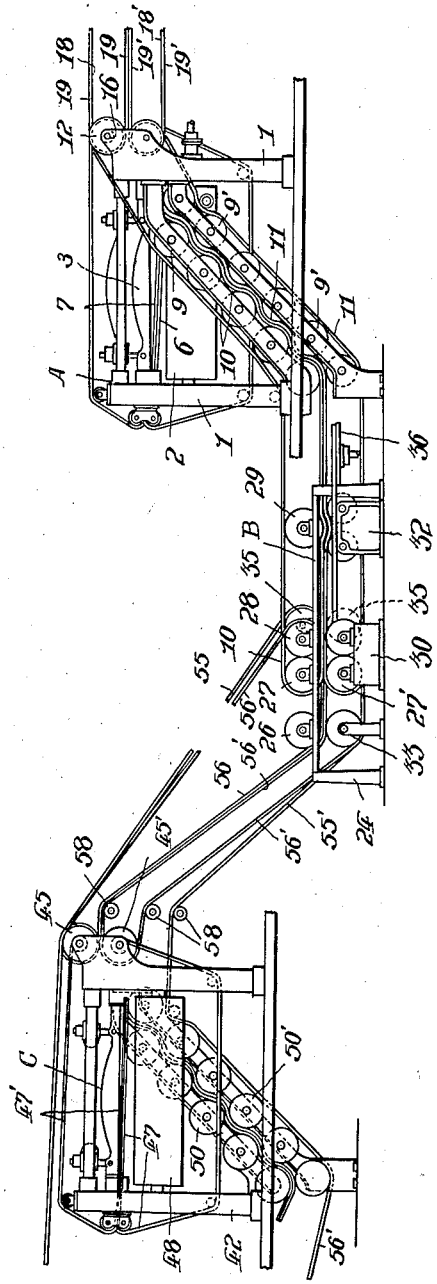
Fig. 1 is a front schematical view of a machine embodying the invention.
Figure 4:
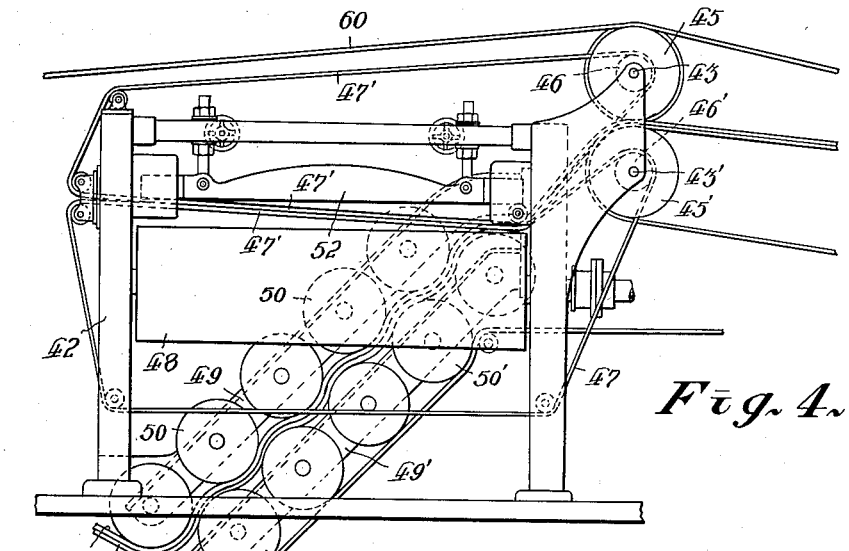
Fig. 4 is a front detail view in an enlarged scale of an arrangement shown on the left-hand end in Fig. 1.
Figure 5:
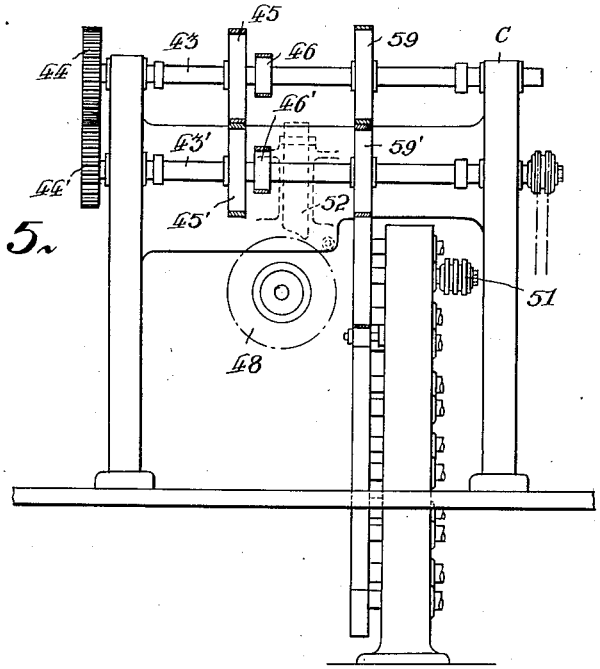
Fig. 5 is a side view of the arrangement shown in Fig. 4.

Referring now to the drawings, A represents a fiber opening apparatus on the right side, in which a beater 2 is rotatably mounted on frame 1. 3 represents a guide for material arranged above the beater 2. The space between the guide and the beater may be adjusted by means of a toothed rod 4 and a toothed wheel 5 in an engagement therewith. Endless bands 6 and 7 are arranged substantially in parallel to the axis of the beater over a number of rollers, for catching material between them and conveying material. A number of guide rollers 9 and 9' in two rows are mounted in a staggered relation on supporting plates 8 and 8' arranged in an oblique relation to the axis of the beater. Conveyor bands 10 and 11 are arranged to pass through between two rows of the guide rollers. The conveyor band 10 is arranged over an upper press roller 12 and the conveyor band 11 is arranged over another upper press roller 12'. Each of these rollers is divided into three members 13, 14 and 15, and 13', 14' and 15' respectively, and the rollers 13' and 15' and the rollers 13 and 15 are securely mounted on a shaft 16 and a shaft 17 respectively, and the rollers 14 and 14' are movably mounted on the shafts 16 and 17 respectively. Over the press rollers 13 and 15, and 13' and 15', are arranged material conveyor bands 18, 18', 19 and 19'. The rollers 13, 15, 13' and 15' are driven from a driving wheel 20 through means of the shaft 17 and toothed wheel 21 secured on its one end, and a toothed wheel 21' secured on one end of the shaft 16 and engaging with the toothed wheel 20. The conveyor bands 10 and 11 are driven from a driving wheel 22 through means of any one of the rollers 9.

B represents a material catch changing apparatus, in which supports 24, 24', 25 and 25' are mounted on standards 23, and rollers 26, 27, 28 and 29 are rotatably mounted on the supports 24 and 24'. Rollers 27' and 28' are rotatably mounted in a co-operative relation with the rollers 27 and 28 respectively on a support 30 provided for that purpose, and rollers 31 and 31' are rotatably mounted in a co-operative relation with the roller 29 on a support 32 provided for that purpose. 33 represents a guide roller arranged below the roller 26. On the supports 25 and 25' are mounted rollers 34 and 35. Rollers 34' and 35' are mounted in a co-operative relation with the roller 35 on a support 30' provided for that purpose. Rollers 36 and 37 are arranged in horizontal position on a vertical shaft respectively, over which an endless band 39 having a number of pins secured thereon is arranged in an oblique relation to the material conveyor bands 10 and 11, and an endless rope 40 is arranged in a co-operative relation with the endless band 36 below the pins 38 over wheels 41 and 41'.

C represents a fiber opening apparatus on the left side, which is similar to the fiber opening apparatus A in construction. On frame 42, are rotatably supported shafts 43 and 43', on one end of which are secured toothed wheels 44 and 44' in engagement respectively. Rollers 45 and 45' and rollers 46 and 46' of smaller diameter than the rollers 45 and 45' are also securely mounted on the shafts 43 and 43'. 47 and 47' represent material conveyor endless bands, which are arranged partly in parallel to the axis of a beater 48 over guide rollers mounted on the frames and are driven by means of the rollers 46 and 46'. 49 and 49' represent supporting plates arranged in an oblique relation to the beater shaft, on which a number of rollers are rotatably mounted in two rows in a staggered relation. The rollers are driven from a driving wheel 51 through means of the shaft of one roller of these rollers. Material conveyor bands 55' and 60 are arranged to pass through between two rows of these rollers. 52 represents a guide roller for material above the beater 48, 58 guide rollers between the fiber opening apparatus C and material catch changing apparatus B, 53 a guide roller arranged between the supports 25 and 25', 54 a guide roller arranged on the support 30'.

In the fiber opening apparatus A on the right-hand end, the endless bands 19 and 19' will be circulated over the rollers 12 and 12', catching material between them, the conveyor band 10 will be circulated over rollers 12 and 27 and guided by the roller 29, and the conveyor band 11 will be circulated over the rollers 12' and 27' and guided by the rollers 31, 31' and 9'. These conveyor bands 10 and 11 are pressed by the rollers 9 and 9' so as to wave between them, for subjecting material to a pressing action. The endless band 6 will be circulated over the press roller 12, and the endless band 7 will be circulated over the press roller 12'. In the fiber opening apparatus C on the left-hand end, the conveyor 56 is arranged over the rollers 28, 26 and 45, the conveyor band 56' is arranged over the rollers 28' and 33, conveyor band 55 over the rollers 35, 53, 34 and 59, the conveyor band 55' over the rollers 35', 54, 59' and 50, the conveyor band 47 over the roller 46, the conveyor band 47' over the roller 46', the conveyor band 60 over the rollers 50 and 59, to be circulated.

In operation, ramie raw material is first placed between the conveyor bands 19 and 19' and will be carried through whole working mechanisms. The material caught between the bands 19 and 19' will be rolled by the press rollers 12 and 12' when passing through between them. On further travel, a left-hand part of the material with reference to Fig. 3 will be taken in between the endless bands 6 and 7, while a right-hand part of the material will be taken in between the bands 10 and 11 which are moved by means of the rollers 9 and 9', whereby a part of the material will be horizontally moved, while another part will be moved downwards. The material carried between the endless bands 6 and 7 and conveyor bands 10 and 11 will, therefore, tend to be drawn downwards due to the downward movement of the conveyor bands 10 and 11 and the horizontal movement of the endless bands 6 and 7, and the material will be carried between the guide 3 and the beater 2, whereby the material is subjected to an opening action. The speeds of the endless bands 6 and 7 and the conveyor bands 10 and 11 are maintained at a ratio such as one end of the material reaches a separating point of the portions in contact of the endless bands 6 and 7 at the same time as when the conveyor bands 10 and 11 reach that point, so that the opening of the part of the material other than the part carried between the conveyor bands, that is, the portion carried between the endless bands 6 and 7 is completed when it reaches at the above said position.

Thus, the material will be carried into the material catch changing apparatus as clearly shown in Fig. 7 by means of the conveyor bands 10 and 11, the portion on the left of the opened portion and the portion caught between the conveyor bands not being opened, and the opened portion depending from the portion caught between the conveyor bands, and then the opened portion a (Fig. 8) will be moved in an oblique direction, being caught by the pins 38 on the endless band 39, and unopened portion b will be moved in a straight direction, being carried between the conveyor bands 10 and 11. The opened portion of fiber will, therefore, be tensioned as shown by the dash and dot lines in Fig. 8 and the material will be moved with the end parts c thereof carried between the conveyor bands 55 and 55' arranged over the rollers 53 and 54, while the unopened portion carried between the conveyor bands 10 and 11 will be taken in between the conveyor bands 56 and 56' arranged over the rollers 28 and 28', and then will be moved, being carried between said bands. Thus, material will be moved upwards, being carried between the conveyor bands 55 and 55' and the conveyor bands 56 and 56', and will be passed on to the opening apparatus C on the left-hand end through the guide rollers 58 and between the rollers 45 and 45'. The opened portion of material will be moved downwards by means of the rollers 50 and 50', being carried between the conveyor rollers 60 and 55', and the unopened portion will be moved forwards, being taken in between the conveyors 47 and 47', and will be opened by means of the beater 48 in a similar manner to that described with reference to the opening apparatus A. In this case, the speed of the conveyor bands 47 and 47' is made smaller than that of the conveyor bands 55' and 60 by means of the rollers 46 and 46'. In this manner, unopened portion will be opened in its entirety and carried into a certain position by means of the conveyor bands.

From the foregoing, it will be seen that the machine according to the invention is characterized in that the opening of fiber can be ensured, as the portion of material other than the portion carried between the conveyor bands is opened in a drawing manner, and that fiber opening operation similar to an artificial fiber opening operation can be effected mechanically and continuously, and material can be opened in its entirety with no waste due to opened portion and unopened portion being reversed by means of a material catch changing apparatus.

Having now particularly described and ascertained the nature of my said invention and in what manner the same is to be performed, I claim:

A fiber dressing machine comprising two fiber opening apparatuses, each of which comprises an arrangement for moving downwards material in an inclined relation by holding its one end between conveyor bands, a beater shaft, an arrangement for holding the other end of the material between horizontal parts of conveyor bands in parallel to the beater shaft and an arrangement by which one end of the material reaches below the first mentioned conveyor bands at the same time when the other end of the material reaches the end of the horizontal parts of the second mentioned bands, the speed of the conveyor bands being different, and a material catch changing apparatus arranged between said two fiber opening apparatuses, which comprises conveyor bands for holding the material therebetween, an endless band with a number of elements for conveying the opened material and conveyor bands having parts parallel to said conveyor bands for holding the material, one end of which is associated with said endless band for conveying the opened material.

AKIRA TAKATA.